UNITED STATES PATENT OFFICE.

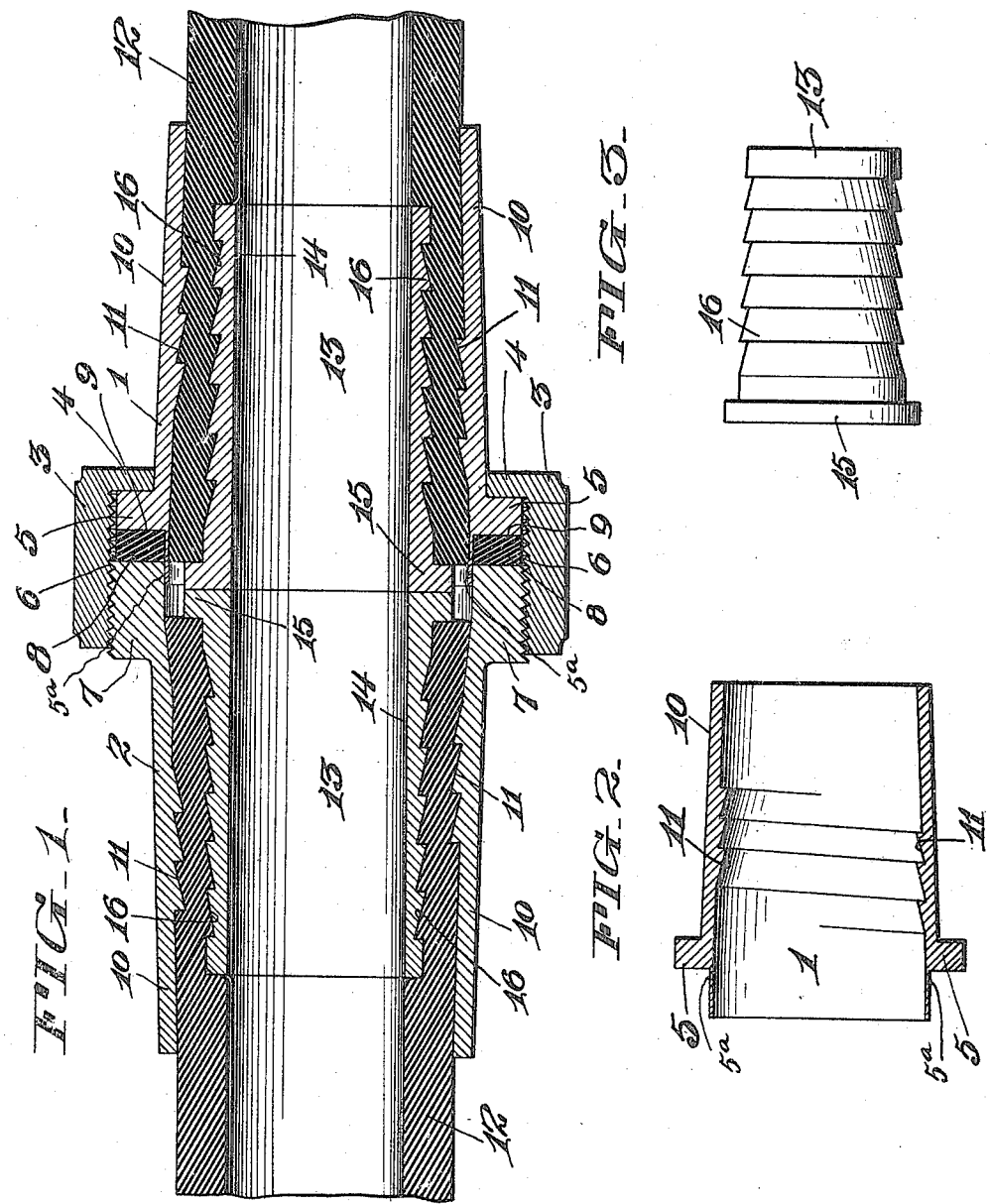

HARRY N. EVANS, SR., OF PHILADELPHIA, PENNSYLVANIA, ASSIGNOR OF TWO-THIRDS TO ADAM M. JOYCE AND BENJAMIN H. GREEN, BOTH OF PHILADELPHIA, PENNSYLVANIA.

HOSE-COUPLING.

1,222,088.  Specification of Letters Patent.  Patented Apr. 10, 1917.

Application filed December 2, 1915. Serial No. 64,605.

*To all whom it may concern:*

Be it known that I, HARRY N. EVANS, Sr., a citizen of the United States, residing at Philadelphia, in the county of Philadelphia and State of Pennsylvania, have invented certain new and useful Improvements in Hose-Couplings, of which the following is a specification.

My invention relates to improvements in hose couplings, the object of the invention being to provide improved means for connecting an ordinary rubber or other flexible hose with a coupling member, so that the joint will be steam, air, and water tight and adapted for any use to which a tight coupling can be put.

A further object is to provide a hose coupling which is of extremely simple construction, comparatively cheap to manufacture, and which most efficiently performs the functions for which it is intended.

With these and other objects in view, the invention consists in certain novel features of construction and combinations and arrangements of parts as will be more fully hereinafter described and pointed out in the claim.

In the accompanying drawings:

Figure 1 is a view in longitudinal section illustrating my improvements.

Fig. 2 is a view in longitudinal section on a reduced scale illustrating the outer casing 10, and Fig. 3 is a view in elevation on a reduced scale of one of the expanding sleeves 13.

In Fig. 1, I illustrate my invention in connection with a two member hose coupling. 1 and 2 represent the two coupling members which may be locked together in various ways. I have illustrated a simple form of construction in which I employ a coupling ring 3 having an inwardly projecting flange 4 at one end engaging against an annular flange 5 on member 1.

The ring 3 is internally screw-threaded as shown at 6, and engages an externally screw-threaded annular enlargement 7 on member 2. 8 is a gasket interposed between the coupling members and preferably located in an annular groove or annular space 9 between the flange 5 and annular enlargement 7. The gasket 8 surrounds an annular flange $5^a$ which projects beyond the flange 5. This annular flange $5^a$ is of such outer diameter as to slidingly fit or telescope within the member 2 and serves as centering or alining means for said members 1 and 2. Furthermore, it will be noted that as the gasket 8 wears or becomes thinner by compression, the flange $5^a$ will move farther within the member 2, thereby always providing a secure joint at the junction of said members with the gasket 8 housed therebetween.

In many respects the coupling members 1 and 2 are precisely alike. Each coupling member comprises an outer tapering casing 10 having on its inner face a screw-thread 11. This screw-thread 11 preferably comprises but a relatively few convolutions, and the threads are beveled so that they are highest at their edges adjacent the smaller end of the casing, and taper toward the larger end of the casing.

12, 12, represent sections of ordinary rubber or other flexible hose, and 13, 13, are my improved expanding sleeves. These sleeves 13 have an internal longitudinal bore 14 of a diameter substantially the same as the internal diameter of the hose 12.

The sleeves 13, on their outer faces, taper or incline, so that they constitute circular wedges which when forced into the hose, expand the latter.

Annular flanges 15 are provided on the larger ends of the sleeves 13 which bear against the ends of the hose and limit the longitudinal movement of the expanding sleeves in one direction. On the outer faces of the expanding sleeves, annular beveled beads 16 are made which operate to press within the inner face of the hose and prevent a withdrawal of the sleeves after they are in operative position.

In assembling the parts, the sleeve 13 is first inserted in the hose, then the hose is inserted through the larger end of the casing 10 of the coupling member and forced longitudinally in that direction as far as possible, which will be substantially the position shown in Fig. 1.

To further clamp the hose, the casing 1 will be given a partial or complete turn as may be necessary to cause the teeth 11 to bite into the hose and move the casing longitudinally of the hose, so that the opposed tapering faces of sleeve 13 and casing 10 will securely clamp the hose and cause the latter to conform in shape to the surfaces engaging the same as shown in the drawings.

When the coupling members are secured together by the ring 3, the flanged ends 15 of the sleeves 13 will be pressed against each other, tending to move the sleeves longitudinally and further facilitate the clamping action of the hose as will be readily understood.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

The combination in a hose coupling, of two outer sleeves having internal hose engaging threads therein, one sleeve having an annular flanged end, one end of the other sleeve being provided with external screw-threads, a gasket interposed between said ends, a coupling member having internal screw-threads for engagement with said external screw-threads and having a portion movable into engagement with said flange to compress the gasket, one of said sleeves having a projecting annular flange designed to slidably fit within the other of said sleeves and extending transversely to said gasket, said gasket fitting around said latter flange, and two internal sleeves provided with external hose engaging beveled beads and each having a flange designed to form abutments for the ends of the hose, the end portions of the hose being adapted to extend between said external and internal sleeves, substantially as described.

In testimony whereof I have signed my name to this specification in the presence of two subscribing witnesses.

HARRY N. EVANS, Sr.

Witnesses:
 Chas. E. Potts,
 Marie Jackson.

Copies of this patent may be obtained for five cents each, by addressing the "Commissioner of Patents, Washington, D. C."